(12) United States Patent
Lee et al.

(10) Patent No.: US 9,772,730 B2
(45) Date of Patent: Sep. 26, 2017

(54) TOUCH PANEL WITH FUNCTION OF FINGERPRINT IDENTIFICATION

(71) Applicant: TPK Touch Solutions (Xiamen) Inc., Xiamen (CN)

(72) Inventors: Yuh-Wen Lee, Hsinchu (TW); Jiangping Chen, Xiamen (CN); Hao Chen, Wuhan (CN); Yu Zhang, Xiamen (CN); Hebo Yang, Xiamen (CN); Liangzhen Xu, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 37 days.

(21) Appl. No.: 14/740,272

(22) Filed: Jun. 16, 2015

(65) Prior Publication Data
US 2015/0371076 A1 Dec. 24, 2015

(30) Foreign Application Priority Data

Jun. 18, 2014 (CN) .......................... 2014 1 0274517
Feb. 9, 2015 (CN) .......................... 2015 1 0067002

(51) Int. Cl.
*G06F 3/044* (2006.01)
*G06K 9/00* (2006.01)
*G06F 3/041* (2006.01)

(52) U.S. Cl.
CPC .............. *G06F 3/044* (2013.01); *G06F 3/041* (2013.01); *G06K 9/00013* (2013.01); *G06F 2203/04103* (2013.01); *G06F 2203/04107* (2013.01)

(58) Field of Classification Search
CPC .................... G06F 3/041–3/044; G06F 9/0002
See application file for complete search history.

(56) References Cited

U.S. PATENT DOCUMENTS

| | | | | |
|---|---|---|---|---|
| 6,459,460 B1* | 10/2002 | Yamanaka | ........ | G02F 1/133308 349/58 |
| 7,929,736 B2* | 4/2011 | Bechtel | ............... | G06F 3/03545 340/5.53 |
| 8,500,292 B2* | 8/2013 | Lo | ...................... | G02F 1/133308 362/627 |
| 8,760,559 B2* | 6/2014 | Liu | .................... | H01L 27/14618 348/340 |
| 9,268,989 B2* | 2/2016 | Pope | ....................... | G06F 3/044 |
| 9,298,317 B2* | 3/2016 | Chou | ................. | G06K 9/00026 |
| 9,322,862 B2* | 4/2016 | Chou | ....................... | G06F 3/044 |
| 9,383,845 B2* | 7/2016 | Yoshiyama | ............. | G06F 3/044 |
| 2007/0115268 A1* | 5/2007 | Jang | ................... | G02F 1/133308 345/183 |
| 2007/0115269 A1* | 5/2007 | Jang | ................... | G02F 1/133308 345/183 |
| 2008/0138589 A1* | 6/2008 | Wakabayashi | ........... | G06F 3/044 428/195.1 |
| 2010/0220900 A1* | 9/2010 | Orsley | .................. | G06F 3/0421 382/124 |

(Continued)

*Primary Examiner* — Patrick F Marinelli
(74) *Attorney, Agent, or Firm* — Paul Bendemire (57) ABSTRACT

A touch panel includes a substrate, a touch sensing structure and a fingerprint identification module. The touch sensing structure is disposed on the substrate. The fingerprint identification module is directly adhered to the substrate. The touch sensing structure and the fingerprint identification module are located at the same side of the substrate.

22 Claims, 7 Drawing Sheets

(56) References Cited

U.S. PATENT DOCUMENTS

| | | | |
|---|---|---|---|
| 2011/0102370 A1* | 5/2011 | Kono | G06F 3/044 345/174 |
| 2011/0235364 A1* | 9/2011 | Lo | G02F 1/133308 362/611 |
| 2011/0267298 A1* | 11/2011 | Erhart | G06F 1/1626 345/173 |
| 2012/0118628 A1* | 5/2012 | Pakula | G06F 1/1626 174/520 |
| 2012/0154296 A1* | 6/2012 | Hinckley | G06F 3/0416 345/173 |
| 2012/0169639 A1* | 7/2012 | Tu | G02B 5/208 345/173 |
| 2012/0229686 A1* | 9/2012 | Imamura | G06F 1/1616 348/333.01 |
| 2012/0247937 A1* | 10/2012 | Saito | G06F 3/041 200/512 |
| 2012/0314126 A1* | 12/2012 | Liu | H01L 27/14618 348/374 |
| 2013/0093697 A1* | 4/2013 | Sun | G06F 3/044 345/173 |
| 2013/0100039 A1* | 4/2013 | Hong | B32B 37/1207 345/173 |
| 2013/0277196 A1* | 10/2013 | Mi | G06F 3/044 200/600 |
| 2013/0307818 A1* | 11/2013 | Pope | G06F 3/044 345/174 |
| 2014/0087197 A1* | 3/2014 | Weber | G02B 1/105 428/432 |
| 2014/0103941 A1* | 4/2014 | Chou | G06F 3/044 324/658 |
| 2014/0114007 A1* | 4/2014 | Nogami | B24B 37/00 524/487 |
| 2014/0140588 A1* | 5/2014 | Chou | G06K 9/0002 382/124 |
| 2014/0168121 A1* | 6/2014 | Chou | G06K 9/00013 345/173 |
| 2014/0168167 A1* | 6/2014 | Chou | G06K 9/00026 345/175 |
| 2014/0216914 A1* | 8/2014 | Pope | G06F 3/044 200/600 |
| 2014/0218330 A1* | 8/2014 | Ady | H03K 17/962 345/174 |
| 2014/0233161 A1* | 8/2014 | Liu | C03C 15/00 361/679.01 |
| 2015/0000837 A1* | 1/2015 | Kim | A61B 5/1172 156/275.5 |
| 2015/0022495 A1* | 1/2015 | Bussat | G06F 3/044 345/174 |
| 2015/0064432 A1* | 3/2015 | Matsuyuki | G02B 1/115 428/216 |
| 2015/0135108 A1* | 5/2015 | Pope | G06K 9/00006 715/767 |
| 2015/0153864 A1* | 6/2015 | Yoshiyama | G06F 3/041 345/173 |
| 2015/0185954 A1* | 7/2015 | Chang | G06F 3/0416 345/173 |
| 2015/0220183 A1* | 8/2015 | Youngs | G06F 3/044 345/173 |
| 2015/0233989 A1* | 8/2015 | Chou | G01R 27/2605 345/174 |
| 2015/0234494 A1* | 8/2015 | Cao | G06F 3/044 345/174 |
| 2015/0363629 A1* | 12/2015 | Lee | G06F 3/041 345/173 |
| 2015/0371076 A1* | 12/2015 | Lee | G06F 3/041 382/124 |
| 2016/0004896 A1* | 1/2016 | Pope | G06F 3/044 382/124 |
| 2016/0070414 A1* | 3/2016 | Shukla | G06F 3/0418 345/178 |
| 2016/0077622 A1* | 3/2016 | Lee | G06F 1/1626 345/173 |
| 2016/0109974 A1* | 4/2016 | Lee | B32B 9/04 345/173 |
| 2016/0171271 A1* | 6/2016 | Lundahl | G06K 9/0002 382/124 |
| 2016/0212872 A1* | 7/2016 | Pakula | G06F 1/1626 |
| 2016/0216813 A1* | 7/2016 | Setlak | G06K 9/00033 |
| 2016/0216823 A1* | 7/2016 | Setlak | G06F 3/0416 |
| 2016/0217311 A1* | 7/2016 | Bhagavat | H01L 27/14634 |
| 2016/0224142 A1* | 8/2016 | Yang | G06F 3/041 |
| 2016/0224178 A1* | 8/2016 | Yang | G06F 3/0416 |
| 2016/0357294 A1* | 12/2016 | Ozeki | G06F 3/0412 |

* cited by examiner

TOUCH PANEL WITH FUNCTION OF FINGERPRINT IDENTIFICATION

This Non-provisional application claims priority under 35 U.S.C. §119(a) on Patent Application No. 201410274517.X filed in People's Republic of China on Jun. 18, 2014 and No. 201510067002.7 filed on Feb. 9, 2015, the entire contents of which are hereby incorporated by reference.

BACKGROUND OF THE INVENTION

Technical Field

The disclosure is relative to a touch panel, and in particular, to touch panels with function of fingerprint identification.

Related Art of the Invention

With the progression of technology, fingerprint identification technology is widely applied to various kinds of electronic devices because it provides security identification function. Recently, the fingerprint identification technology has been applied to smart phones providing excellent theft and privacy protection for personal mobile content, and attracting public attention and becoming a main development focus for future similar electronic devices.

Smart phone using the current techniques having the fingerprint identifier disposed correspondingly to an activity key of the smart phone, e.g. a main page button. The activity key is usually disposed in the specific through hole of the mobile cover plate, but there is a chink between it and the mobile cover plate. Thus, small dirt particles readily adhere to the surroundings of the specific through hole, which degrades the appearance of the mobile phone and makes the phone less comfortable for the user. In addition, the specific through hole is usually made by drilling a hole on the entire surface of the cover plate and performing polishing. This manufacturing process is difficult and impacts overall stress distribution of the cover plate thus causing damage to the strength of the cover plate. Therefore, it disturbs process yield and performance of product.

SUMMARY OF THE INVENTION

In view of the above technique problem, a touch panel with function of fingerprint identification is provided. The touch panel with function of fingerprint includes a substrate, a touch sensing structure and a fingerprint identification module. The touch sensing structure is disposed on the substrate. The fingerprint identification module is adhered to the substrate. Wherein, the touch sensing structure and the fingerprint identification module are disposed on the same side of the substrate.

In one or more embodiments, a first adhesive layer is disposed between the fingerprint identification module and the substrate to attach the fingerprint identification module to the substrate.

In one or more embodiments, a glue surrounds the fingerprint identification module.

In one or more embodiments, a masking layer is disposed on the substrate, the masking layer is located between the substrate and the fingerprint identification module, and the orthographic projection of the masking layer onto the substrate at least covers that of the fingerprint identification module onto the substrate.

In one or more embodiments, the substrate has a concave portion, and the orthographic projections of the concave portion and the fingerprint identification module onto the substrate overlap each other.

In one or more embodiments, a shielding structure is disposed on the substrate and surrounds the fingerprint identification module.

In one or more embodiments, a shielding structure is disposed between the substrate and the masking layer, and surrounds the fingerprint identification module.

In one or more embodiments, a shielding structure surrounds the fingerprint identification module, and the masking layer is disposed between the substrate and the shielding structure.

In one or more embodiments, an electrode layer and a wiring layer are electrically connected to each other, and the electrode layer and the wiring layer are formed on the substrate.

In one or more embodiments, a second adhesive layer is disposed between the touch sensing structure and the substrate, and the second adhesive layer attaches the touch sensing structure to the substrate.

In one or more embodiments, the touch sensing structure includes an electrode layer, a wiring layer and a touch substrate, the electrode layer and the wiring layer are electrically connected to each other and formed on the touch substrate, and the electrode layer and the wiring layer are located between the second adhesive layer and the touch substrate.

In one or more embodiments, the touch sensing structure includes an electrode layer, a wiring layer and a touch substrate, the electrode layer and the wiring layer are electrically connected to each other and formed on the touch substrate, and the touch substrate is located between the second adhesive layer, the electrode layer and the wiring layer.

In one or more embodiments, the touch sensing structure further includes a conductive layer disposed on the touch substrate, and the conductive layer and the electrode layer are respectively disposed on the different sides of the touch substrate.

In one or more embodiments, the substrate has a first surface and a second surface opposite to the first surface, the touch sensing structure and the fingerprint identification module are disposed on the second surface, and the first surface is caved in toward the second surface to form the concave portion.

In one or more embodiments, a depth D is defined as the distance between the first surface of the substrate and a lowest point of the concave portion, and the depth D is less than or equal to 1.7 mm.

In one or more embodiments, the depth D is larger than or equal to 0.05 mm and less than or equal to 0.55 mm.

In one or more embodiments, the depth D is larger than or equal to 0.02 mm and less than or equal to 0.45 mm.

In one or more embodiments, a minimum distance H is defined as a distance between the lowest point of the concave portion and the fingerprint identification module, and the minimum distance H is larger than or equal to 15 μm and less than or equal to 550 μm.

In one or more embodiments, the minimum distance H is larger than or equal to 80 μm and less than or equal to 400 μm.

In one or more embodiments, the concave portion has a bottom surface and at least one side surface adjacent to the bottom surface, and an angle between the bottom surface the side surface is larger than 90 degree and less than 180 degree.

In one or more embodiments, the concave portion has two adjacent side surfaces, and an angle between the two adjacent side surfaces is larger than 90 degree and less than 180 degree.

In one or more embodiments, the substrate further has a side surface adjacent to the first surface and the second surface, the concave portion is an arc surface, one edge of the arc surface is adjacent to the side surface of the substrate, and an opposite edge of the arc surface is adjacent, to the first surface of the substrate.

In one or more embodiments, the first adhesive layer further covers a part of the side surface of the fingerprint identification module, or all surfaces of the fingerprint identification module.

In one or more embodiments, the thickness of the first adhesive layer is larger than 3 μm and less than or equal to 30 μm.

In one or more embodiments, the touch panel with function of fingerprint identification further comprises a reinforcement glue, wherein the substrate has a first surface, a second surface opposite to the first surface, a side surface adjacent to the first surface and the second surface, the touch sensing structure and the fingerprint identification module are disposed on one side of the second surface, and the reinforcement glue at least covers the side surface.

In one or more embodiments, the touch panel with function of fingerprint identification further comprises a reinforcement glue, wherein the substrate further comprises a side surface, the side surface is adjacent to the first surface and the second surface, and the reinforcement glue at least covers the side surface.

In one or more embodiments, the viscosity of the reinforcement glue is 500-1200 mPa·s, and the Shore scleroscope hardness of the reinforcement glue is 60-90D.

In one or more embodiments, a maximum thickness is defined as a distance between the side surface of the substrate and an exterior surface of the reinforcement glue, and the maximum thickness is larger than or equal to 30 μm and less than or equal to 200 μm.

In one or more embodiments, the fingerprint identification module is a fingerprint sensing electrode structure, and formed on one side of the cover layer away from the substrate.

Because the fingerprint identification module according to the invention is directly attached to the substrate, it is not necessary to drill a hole on the substrate that is used for protecting the product (the cover plate of the product), such that the integrity of the substrate is ensured, the strength of the substrate is kept, and the performance of the product is also ensured.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

Embodiments of the present disclosure will be apparent from the following detailed description, which proceeds with reference to the accompanying drawings, wherein like references numerals relate to like elements. To be noted, the terms of "on" and "below" or "up" and "down" in the following illustration are used for showing the relative positions of the elements.

Figure 1:
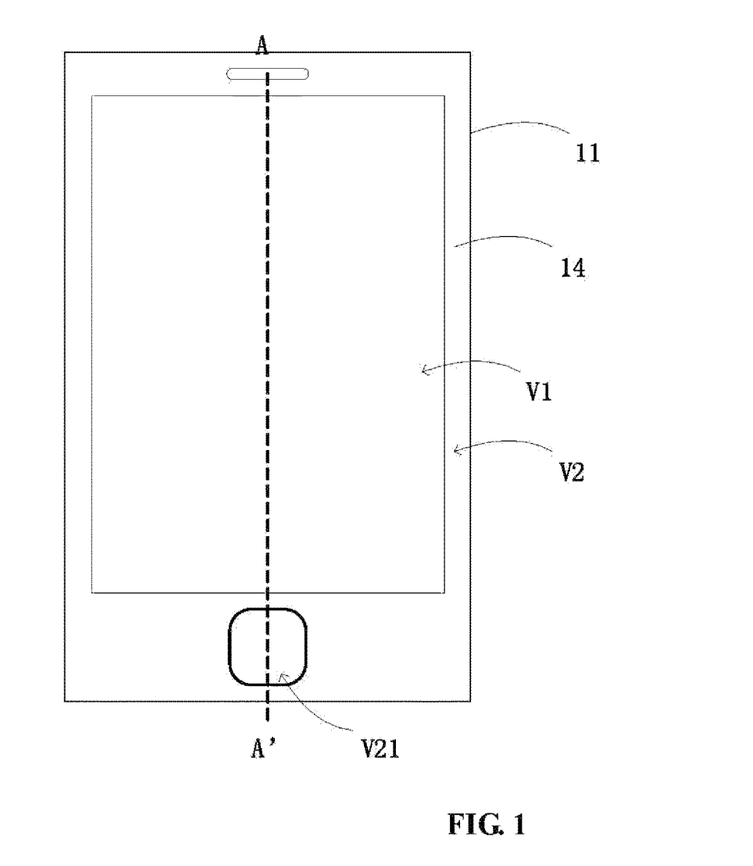
FIG. 1 is a front schematic diagram of a touch panel with function of fingerprint identification according to some embodiments of the present invention.
Figure 2:
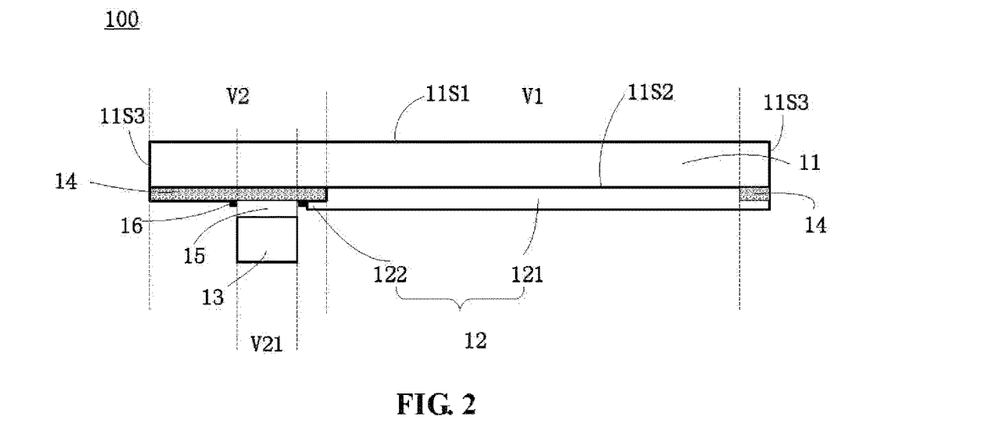
FIG. 2 is a cross-sectional drawing of the touch panel along the cross-section line AA' in FIG. 1 according to some embodiments of the present invention.

Please refer to FIGS. 1-2, in which FIG. 1 is a front schematic diagram of a touch panel with function of fingerprint identification according to some embodiment of the present disclosure. FIG. 2 is a cross-sectional drawing along the cross-section line AA' in FIG. 1. Referring to FIGS. 1-2, the touch panel with function of fingerprint identification 100 includes a substrate 11, a touch sensing structure 12 and a fingerprint identification module 13. The touch sensing structure 12 is disposed on the substrate 11. The fingerprint identification module 13 is adhered to the substrate 13. As shown in FIG. 2, the touch sensing structure 12 is disposed on a lower surface of the substrate 11, and the fingerprint identification module 13 is adhered to the lower surface of the substrate 11. In other words, the fingerprint identification module 13 and the touch sensing structure 12 are disposed on the same side of the substrate 11.

The substrate 11 is made by toughened glass or hard plastic material, and it can act as the protection cover plate of the fingerprint identification module 100 with function of fingerprint identification. The substrate 11 includes a first surface 11S1, a second surface 11S2 and a side surface 11S3. The first surface 11S1 and the second surface 11S2 are disposed opposite to each other. The side surface 11S3 is adjacent to the first surface 11S1 and the second surface 11S2. With respect to second surface 11S2, the first surface 11S1 is closer to the user. The first surface 11S1 is provided for the user to directly execute the touch operation. For enhancing the strength of the substrate 11, the first surface 11S1 and the second surface 11S2 are the surfaces strengthened by the chemical strengthening and/or physical strengthening. Furthermore, the side surface 11S3 can also be the surface strengthened by the chemical strengthening and/or physical strengthening. For ensuring that the fingerprint identification module 13 can identify the fingerprint further accurately, the thickness of the substrate 11 is less than or equal to 0.55 mm. Preferably, the thickness of the substrate 11 is less than or equal to 0.3 mm.

In one or more embodiment, a masking layer 14 is disposed on the lower surface of the substrate 11. The masking layer 14 is disposed between the substrate 11 and the fingerprint identification module 13. The orthographical projection of the masking layer 14 onto the substrate 11 covers the orthographical projection of the fingerprint identification module 13 onto the substrate 11. The masking layer 14 is made of opaque ink or photoresist, and it can hide several opaque elements such as fingerprint identification module below the substrate 11 from view. The masking layer 14 can be a single layer structure, or it can be a multi-layer structure formed by stacking a plurality of layers of materials, which is not limited in the disclosure. In some embodiments, within the touch panel with function of fingerprint identification 100 of the embodiment, the area which the masking layer 14 is located at defines an invisible area V2. The area other than the invisible area V2 is a visible area V1. The invisible area V2 includes a fingerprint identification area V21. The fingerprint identification module 13 is disposed in the invisible area V2, and the area which the fingerprint identification module 13 is located at defines the fingerprint identification area V21.

Figure 3A:
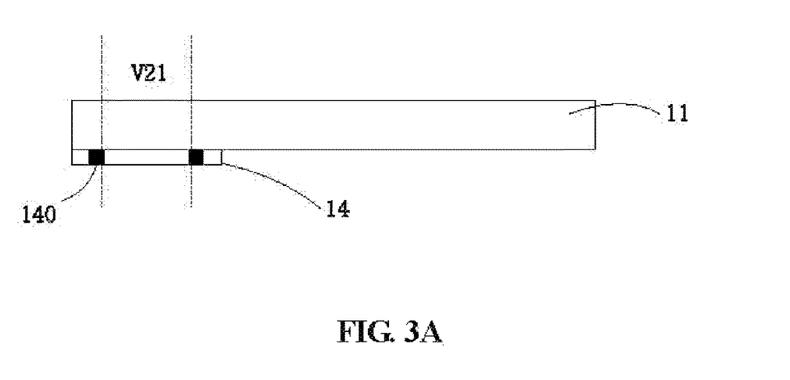
FIG. 3A is a perspective view of the touch panel with function of fingerprint identification according to some embodiments of the present invention.

FIG. 3A is a perspective view of the touch panel with function of fingerprint identification according to some embodiments of the present invention. In order to distinguish the fingerprint identification area V21 from the other part of the invisible area V2 (as shown in FIG. 2), such that the user can preciously and conveniently operate on the fingerprint identification area V21, the masking layer 14 is partially hollowed out and the hollowed space is filled up with light-blocking material of different color from the masking layer 14 to form an pattern structure 140 for indicating the fingerprint identification area V21. In the embodiment shown in FIG. 3A, the pattern structure 140 can be other pattern or shape, and the identification manner of the pattern structure 140 is not limited in the present disclosure.

Figure 3B:
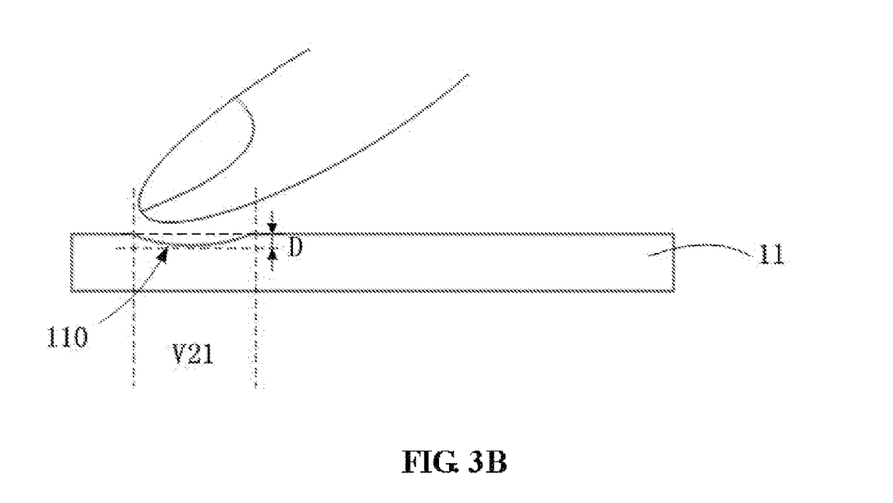
FIGS. 3B-3D are cross-sectional drawings of the touch panel along the cross-section line AA' in FIG. 1 according to various embodiments of the present invention.

Referring to FIG. 3B, FIG. 3B is a cross-sectional drawing of the substrate along the cross-section line in FIG. 1, which shows some other embodiments for indicating the fingerprint identification area V21. The substrate 11 includes a concave portion 110. The orthographical projection of the concave portion 110 onto the substrate 11 and the orthographical projection of the fingerprint identification module 13 overlap each other. Here, the overlap means that at least a part of them overlap each other. In some embodiments, the substrate 11 is caved in from the first surface 11S1 toward the second surface 11S2 at the fingerprint identification area V21 to form a concave portion 110. The user can press or rub on the concave portion 110 to input fingerprint signals. The concave portion 110 in FIG. 3B is a three-dimensional arc groove which the first surface 11S1 is caved in toward the second surface 11S2 at the fingerprint identification area V21 to form. The angle between the tangent lines of the bottom surface and the side surface of the three-dimensional arc groove is larger than 90 degree and less than 180 degree. However, the shape of the concave portion 110 is not limited. Refer to FIGS. 3C-3F, FIGS. 3C-3D are cross-sectional drawings of the substrate of the touch panel along the cross-section line AA' in FIG. 1 according to various embodiments of the present invention. FIG. 3E is a perspective view of the substrate of the touch panel according to some embodiments of the present disclosure. FIG. 3F is a cross-sectional drawing of the substrate of the touch panel along the cross-section line BB' in FIG. 3E according to some embodiments of the present disclosure.

Figure 3C:
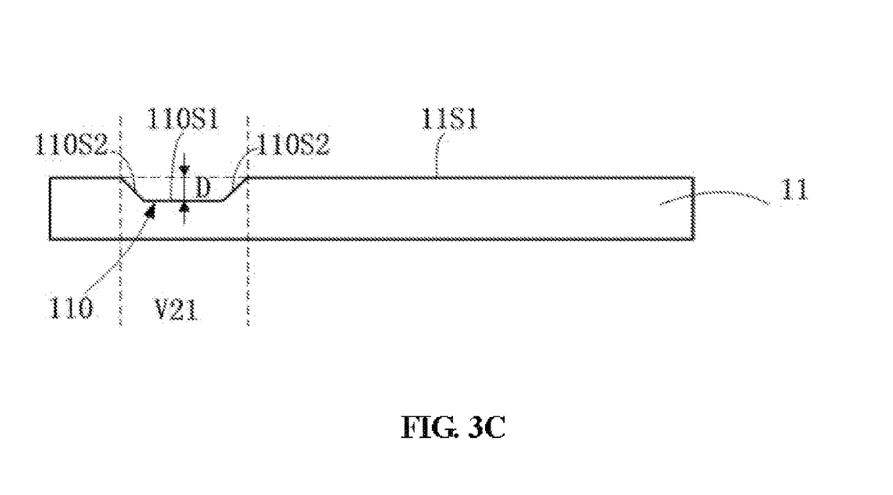

As shown in FIG. 3C, the concave portion 110 includes a bottom surface 110S1 and a side surface 110S2. The bottom surface 110S1 is adjacent to the side surface 110S2. The side surface 110S2 is connected to the first surface 11S1 of the substrate 11. An angle between the bottom surface 110S1 and the side surface 110S2 is larger than 90 degree and less than 180 degree. The concave portion 110, for example, is a three-dimensional groove, and the cross-section of the concave portion 110 is V-shaped.

Figure 3D:
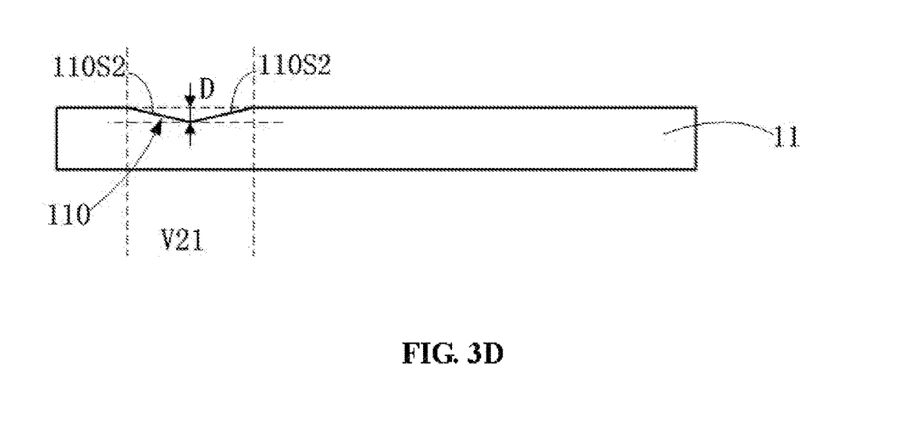
Figure 3E:
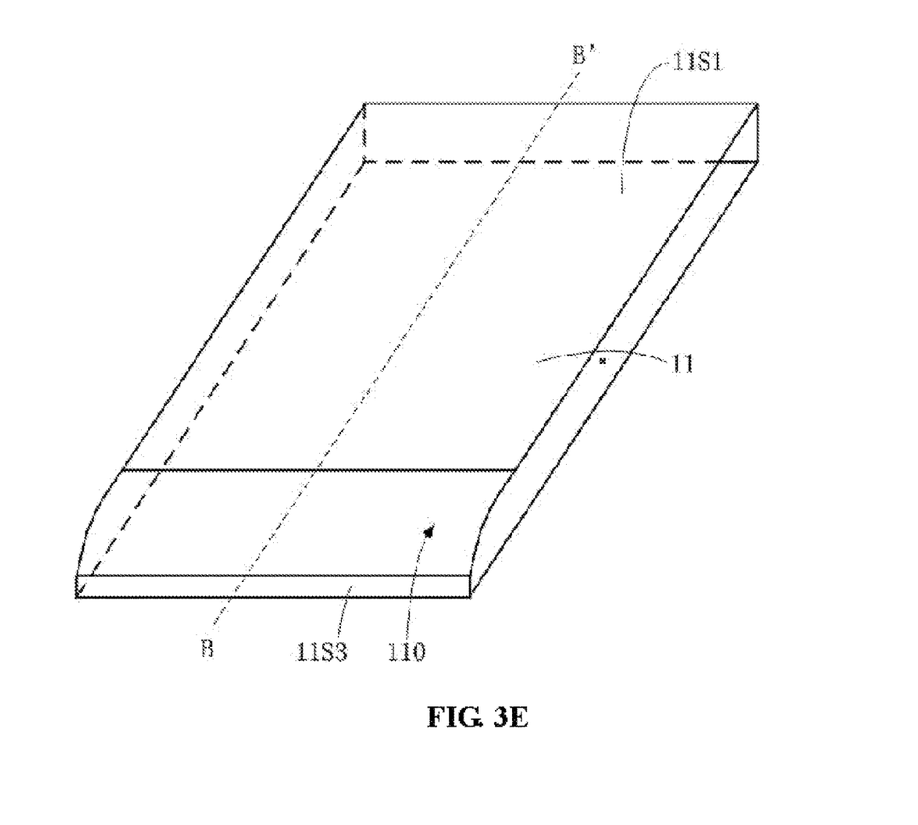
FIG. 3E is a perspective view of the substrate of the touch panel according to some embodiments of the present invention.
Figure 3F:
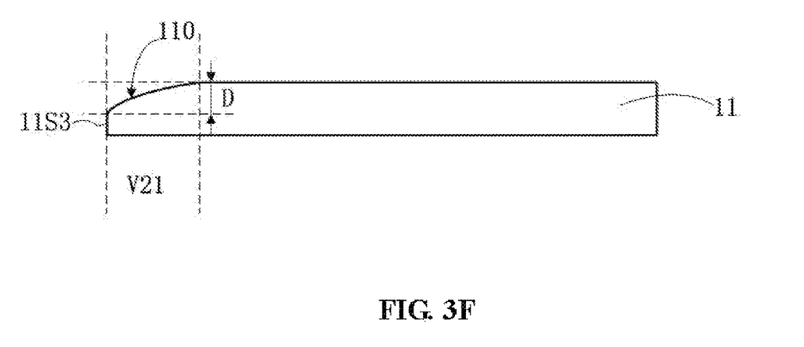
FIG. 3F is a cross-sectional drawing of the substrate of the touch panel along the cross-section line BB' in FIG. 3E according to some embodiments of the present invention.

As shown in FIG. 3D, the concave portion 110 includes two adjacent side surfaces 110S2. The intersection point of the two side surfaces 110S2 is the lowest point of the concave portion 110. An angle of the two side surfaces 110S2 is larger than 90 degree and less than 180 degree. The concave portion 110, for example, is a three-dimensional groove, and the cross-section of the concave portion 110 is V-shaped.

As shown in FIG. 3E and FIG. 3F, the concave portion 110 is an arc surface. One edge of the arc surface is adjacent to the side surface 11S3 of the substrate 11 and the opposite edge is adjacent to the first surface 11S1 of the substrate 11. It is noted that the first surface 11S1 is caved in toward the second surface 11S2 at the fingerprint identification area V21 to form the concave portion 110 in FIG. 3B to FIG. 3D. For easily manufacturing and better appearance of the touch panel, in FIG. 3E, the concave portion 110 can also be formed by processing one side of the substrate 11, the side surface 11S3 and a part of the first surface 11S1. As shown in FIG. 3E, the concave portion 110 is formed by bending one side of the first surface 11S1 toward the side surface 11S3 and the second surface 11S2. In other embodiments, the concave portion 110 can also be formed by bending one side of the first surface 11S1 toward the second surface 11S2 to connect the second surface 11S2. The connection portion where the first surface 11S1 is partially bent to connect the second surface 11S2 can be formed with an angle of chamfer, so that the connection portion is sleek. Thus, the appearance of the touch panel can be enhanced and the user can have more conformance.

In addition, in the configuration shown in FIGS. 3B-3F, for reducing the influence for the appearance and the strength of the substrate caused by the concave portion 110, a depth D is defined as a distance between the first surface 11S1 and the lowest point of the concave portion 110, and the depth D is less than or equal to 1.7 mm. Moreover, the depth D is larger than or equal to 0.05 mm and less than or equal to 0.55 mm. Preferably, the depth D is larger than or equal to 0.02 mm and less than or equal to 0.45 mm. The depth D can be determined in a proper range according to the application of the touch panel, such as in-vehicle electronic device, mobile device and notebook computer. For example, the depth D will be larger in the in-vehicle electronic device. The depth D will be smaller in the application of mobile device, such as mobile phone. In FIG. 3B, the depth D is the vertical distance from the first surface 11S1 to the tangent line at the lowest point of the three-dimensional arc groove.

In FIG. 3C, the depth D is the vertical distance from the first surface 11S1 to the bottom surface 110S1. In FIG. 3D, the depth D is the vertical distance from the first surface 11S1 to the intersection of the two side surfaces 110S2. In FIG. 3E and FIG. 3F, the depth D is the vertical distance from the first surface 11S1 to the connection portion between the arc surface and the edge of the side surface 11S3.

The disposal of the concave portion 110 will not only intuitively indicate the fingerprint identification area V21, but also reduce the distance from the touch panel to the fingerprint identification module 13 for enhancing the sensibility of the fingerprint identification. In addition, by the disposal of the concave portion 110, the exterior of the concave portion 110 of the substrate 11 can be maintained in a proper thickness for enhancing or maintaining the strength of the substrate 11.

Referring to FIG. 2 again, the fingerprint identification module 13 is attached to the substrate 11 via a first adhesive layer 15, and it is located within the invisible area V2. The first adhesive layer 15 is disposed between the masking layer 14 and the fingerprint identification module 13. The area size of their adhesive region is the same as the area size of the adhesive region of the upper surface of the fingerprint identification module 13 and the substrate 11. Taking the tolerance in the adhering process into consideration, in other embodiments of the present disclosure, the area size of the adhesive region which the first adhesive layer 15 is located at can be smaller than that of the upper surface of fingerprint identification module 13 and the lower surface of the substrate 11 for preventing the adhesive from being exposed. The first adhesive layer 15 is a solid adhesive sheet. In order to reduce the influence by the first adhesive layer 15 on obtaining signals by the fingerprint identification module 13, preferably, the material of the first adhesive layer 15 is an explosion-proof adhesive which is light and very viscous.

In one or more embodiments, for enhancing fastness of the fingerprint identification module 13 adhered to the masking layer 4, or reducing the damage or scratching of the fingerprint identification module 13 in the subsequent assembling or manufacturing process, the first adhesive layer 15 can further covers the partial side surface or all surfaces of the fingerprint identification module 13. Thus, not only the fingerprint identification module 13 can be fixed, but also the external force can be buffered for protecting the fingerprint identification module 13, so as to reduce the damage or scratching of the fingerprint identification module 13 in the subsequent assembling or manufacturing process.

The first adhesive layer 15 can be a glue of viscosity. The major material of the first adhesive layer 15 is acrylic resin, and liquid at room temperature, which can be cured by a curing process. The viscosity of the first adhesive layer 15 is 500-1200 mPA·s. Shore scleroscope hardness of the cured first adhesive layer 15 is 60-90D. Taking the viscosity of the first adhesive layer 15 and the impacts for the sensibility of the fingerprint identification, the thickness of the first adhesive layer 15 is less than 50 µm, which is preferably between 3-30 µm. The first adhesive layer 15 with such characters can enhance the strength of the substrate 11 in FIGS. 3B-3F, especially the strength at the fingerprint identification area V21.

The fingerprint identification module 13 can be an integral chip including the fingerprint identification module and the controller. Therefore, the fingerprint identification 13 can be directly adhered to the masking layer 14 through the first adhesive layer 15. In other embodiments, the fingerprint identification module 13 can only be a fingerprint sensing electrode structure. The touch sensing electrode structure is formed on one side of the masking layer 14 away from the substrate 11. The fingerprint sensing electrode structure is connected to the controller to process the fingerprint signal by the controller. Specifically, the fingerprint sensing electrode structure can be directly formed on the surface of one side of the masking layer 14 away from the substrate 11, such that the first adhesive layer 15 can be omitted. Therefore, the distance from the fingerprint identification module 13 to the first surface 11S1 of the substrate 11 is shorten for enhancing the sensibility of the fingerprint identification.

Figure 4:
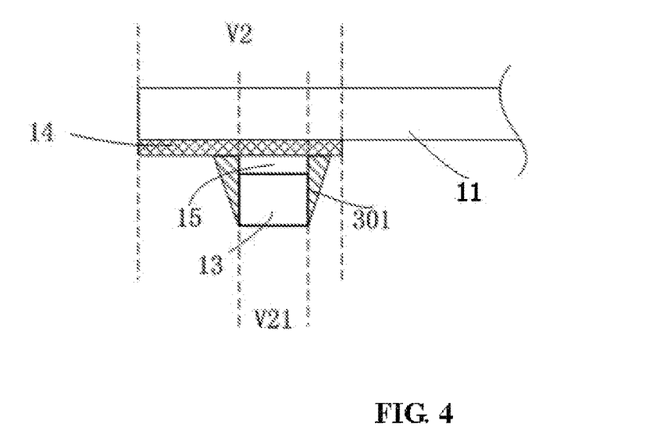
FIG. 4 is a perspective view of the function of fingerprint identification and the substrate of the touch panel with function of fingerprint identification according to some embodiments of the present invention.

It is noted that, in the embodiment of the present disclosure, in order to firmly attach the fingerprint identification module 13 to the substrate 11, a glue can be additionally disposed to surround the periphery of the fingerprint identification module 13 for fixing the fingerprint identification module 13 on the substrate 11, and the details can refer to FIG. 4. FIG. 4 is a perspective view of the function of fingerprint identification and the substrate of the touch panel with function of fingerprint identification according to some embodiments of the present disclosure. The fingerprint identification module 13 is attached to the lower surface of the substrate 11 via the first adhesive layer 15. The first adhesive layer 15 is disposed between the fingerprint identification module 13 and the substrate 11. The glue 301 surrounds the periphery of the fingerprint identification module 13. In detail, the glue 301 is jointed on the exterior of the fingerprint identification module 13, and it extends toward the substrate 11 through the lateral side of the first adhesive layer 15, and then contacts the masking layer 14 disposed on the lower surface of the substrate 11. The glue 301 can be formed by a soft adhesive sheet, and it can also be formed by dispensing and curing the liquid adhesive.

In the configuration in FIG. 4, the fingerprint identification module 13 can be more firmly attached to the lower surface of the substrate 11 by the first adhesive layer 15 and the glue 301. Furthermore, the glue 301 surrounds the fingerprint identification module 13, and it also provides certain noise shielding function for the fingerprint identification module 13 and prevents dust from entering through the lateral gap between the fingerprint identification 13 and the masking layer 14. It can be understood that in the embodiment of the present invention, it can simply utilize the glue 301 is used to attach the fingerprint identification module 13 to the substrate 11 and thus eliminating the first adhesive layer 15. The material of the glue 301 can be the same as that of the first adhesive layer 15. The glue 301 and the first adhesive layer 15 can include a support function for the substrate 11, especially when the concave portion 110 is formed on the substrate 11, which can enhance the strength of the fingerprint identification area V21 of the substrate 11.

Referring to FIG. 2 again, the touch panel with fingerprint identification module 100 according to the present disclosure can further include a shielding structure 16, which is disposed on the substrate 11 and located under the substrate 11 and surrounds the fingerprint identification module 13. The shielding structure 16 is configured to shield the electromagnetic noise for the fingerprint identification module 13. In some embodiments of the present disclosure, a gap exists between the shielding structure 16 and the fingerprint identification module 13 along the direction parallel to the substrate 11, and it prevents the shielding structure 16 from shielding the effective fingerprint touch signals. In some embodiments, the shielding structure 16 is a ring-shaped metal structure and under the substrate 11. Its specific location and structure can respectively refer to FIG. 5A and FIG. 5B.

Figure 5A:
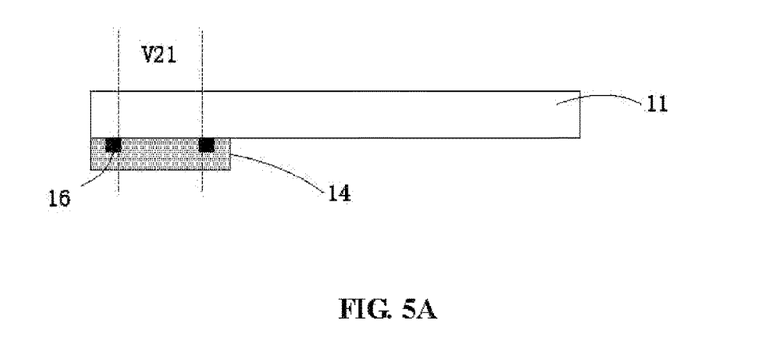
FIG. 5A is a perspective view of the touch panel with function of fingerprint identification according to some embodiments of the present invention.

Referring to FIG. 5A, FIG. 5A is a perspective view of the touch panel with function of fingerprint identification according to the embodiment of the present invention. The shielding structure 16 is disposed on the lower surface of the substrate 11, and disposed between the substrate 11 and the masking layer 14. Because the shielding structure 16 is formed by metal material, its color can be distinguished from the masking layer 14. Thus, when it is disposed between the substrate 11 and the masking layer 14, the user can see the shielding structure 16 from the touch operation surface. Therefore, when it is disposed to surround the fingerprint identification area V21, it can be utilized to indicate the fingerprint identification area V21, such that the other indicating structure can be omitted.

Figure 5B:
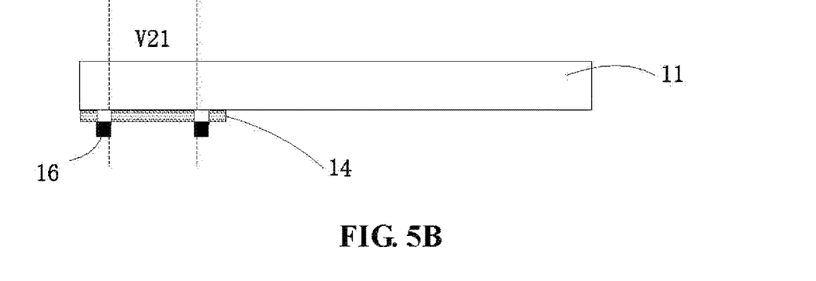
FIG. 5B is a perspective view of the touch panel with function of fingerprint identification according to some embodiments of the present invention.

Referring to FIG. 5B, FIG. 5B is a perspective view of the touch panel with function of fingerprint identification according to some embodiments of the present invention. The shielding structure 16 is disposed on the lower surface of the masking layer 14, and disposed between the masking layer 14 and the first adhesive layer 15. Namely, the masking layer 14 is disposed between the substrate 11 and the shielding structure 16. The shielding structure 16 is disposed corresponding to the hollow place of the masking layer 14 of the embodiment shown in FIG. 3A, such that the user can see the shielding structure 16 from the hollow place of the masking layer 14 due to the color difference between the shielding structure 16 and the masking layer 14 for simultaneously indicating the fingerprint identification area V21 and omitting the step of filling with the other shielding materials in FIG. 3A. It is noted that the shielding structure 16 is a metal component formed independently, and it is disposed under the hollow place of the masking layer 14. The user can see the shielding structure 16 through the hollow place of the masking layer 14. Namely, the hollow place of the masking layer 14 is vacant. In the other embodiment of the present invention, the shielding structure 16 can be formed on the surface of the masking layer 14 by sputtering or printing, so that the hollow place of the masking layer 14 can be filled with the material of the shielding structure 16. As to the final structure, the shielding structure 16 can be partially or fully embedded into the masking layer 14.

Figure 6:
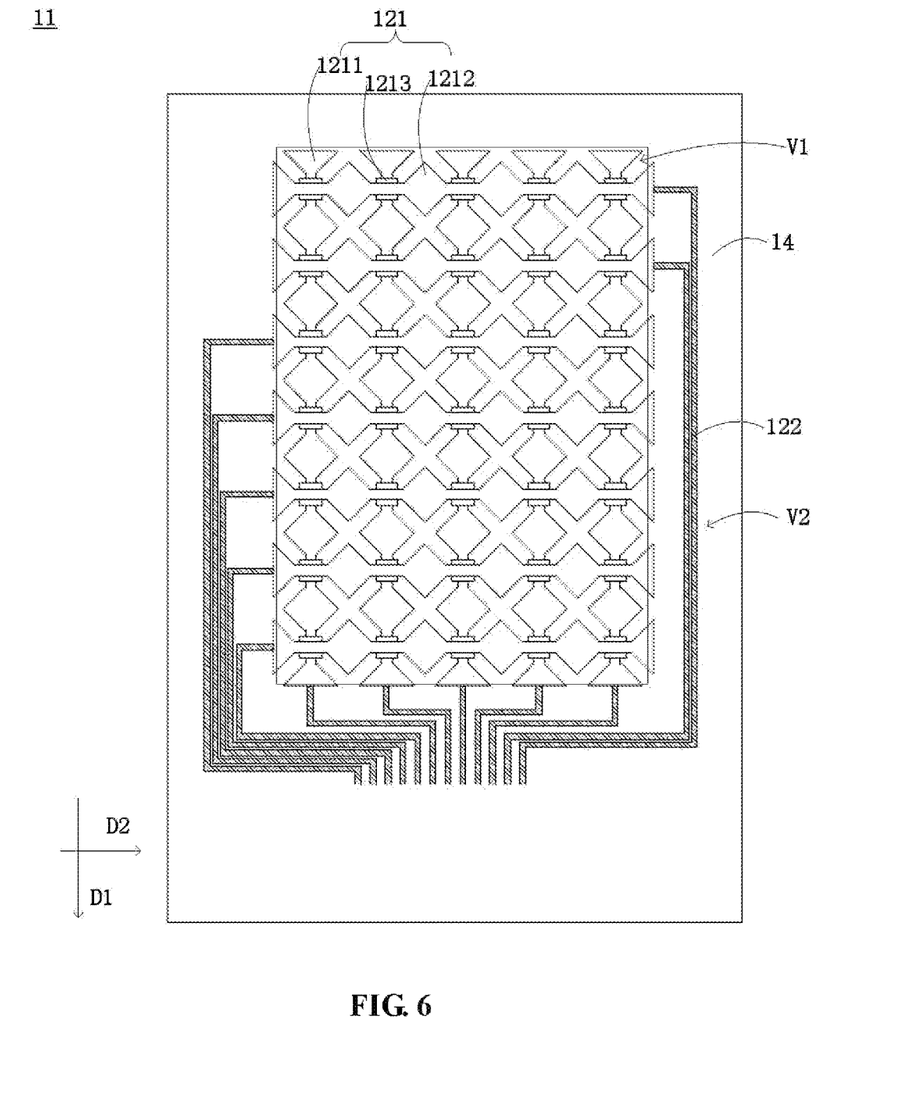
FIG. 6 is a perspective view of the touch sensing structure of the touch panel with function of fingerprint identification according to some embodiments of the present invention.

Referring to FIG. 2 and FIG. 6, FIG. 6 is a perspective view of the touch sensing structure of the touch panel with function of fingerprint identification according to some embodiments of the present disclosure. The touch sensing structure 12 is formed on the lower surface of the substrate 11. In some embodiments, the touch panel is a single-substrate touch panel. The touch sensing structure 12 includes an electrode layer 121 at the visible area V1 and a wiring layer 122 at the invisible area V2. The electrode layer 121 and the wiring layer 122 are electrically connected to each other. The electrode layer 121 includes a plurality of first axial electrodes 1211, a plurality of second axial electrodes 1212 and an insulating layer 1213. The first axial electrodes 1211 extend along a first direction D1 and they are separately arranged in order along a second direction D2. The second axial electrodes 1212 extend along the second direction D2 and they are separately arranged in order along the first direction D1. The insulating layer 1213 is formed by a plurality of insulating blocks at the intersections of the first axial electrodes 1211 and the second axial electrodes 1212 to electrically isolate the first axial electrodes 1211 and the second axial electrodes 1212 from each other. The first axial electrodes 1211 and the second axial electrodes 1212 are respectively electrically connected to wiring layer 122. The first axial electrodes 1211 and the second axial electrodes 1212 are transparent conductive structures. Their material can be one or more of the following materials, such as indium tin oxide, silver nanoparticles, graphene, carbon nanotubes, metal-mesh and other conductive material. The insulating layer 1213 is a transparent insulating structure, which can be made of silicon dioxide ($SiO_2$) or photoresist, etc. The wiring layer 122 is made by metal, and it is disposed at the invisible area V2 under the masking layer 14. The wiring layer 122 is hidden by the masking layer 14 and not watched by the user. In the embodiment, the touch sensing structure 12 can be a sensing structure of single layer of conductive material. In the other embodiments of the present disclosure, the touch sensing structure 12 can be a sensing structure of double or more layer of conductive material, which is not limited in the present disclosure.

In the above embodiments, the touch sensing structure 12 can be directly formed on the lower surface of the substrate 11. In other embodiments, the touch sensing structure 12 can be attached to the substrate 11 via the second adhesive layer 17.

Figure 7:
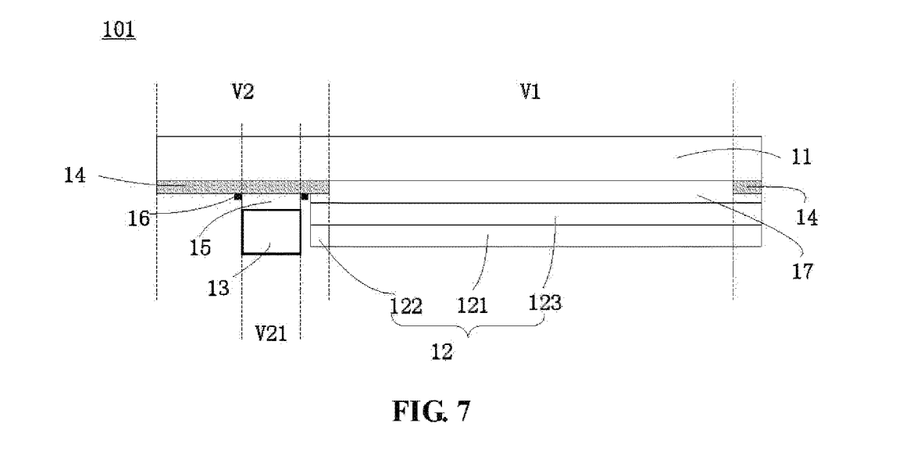
FIG. 7 is a cross-sectional drawing of the touch panel along the cross-section line AA' in FIG. 1 according to some other embodiments of the present invention.

Referring to FIG. 1 and FIG. 7, FIG. 7 is a cross-sectional drawing along the cross-sectional line AA' in FIG. 1, which shows the touch panel with function of fingerprint identification according to anther preferred embodiment of the present disclosure. The difference between the touch panel with function of fingerprint identification 101 of FIG. 7 and FIG. 2 is that the touch sensing structure 12 is attached to the substrate 11 via the second adhesive layer 17, and the touch sensing structure 12 further includes a touch substrate 123.

Specifically, the touch sensing structure 12 is attached to the substrate 11 via the second adhesive layer 17. The second adhesive layer 17 is disposed between the touch sensing structure 12 and the substrate 11. The touch substrate 123 is located between the second adhesive layer 17, the electrode layer 121 and the wiring layer 122. The electrode layer 121 and the wiring layer 122 are formed on the lower surface of the touch substrate 123. It is noted that the touch substrate 123 covers the visible area V1 and extends to a part of the invisible area V2. The area, where the touch substrate 123 is located, is located at one side of the fingerprint identification area V21 which the fingerprint identification module 13 is located at, and they do not overlap and do not cover each other. In the specific structure, the touch substrate 123 and the fingerprint identification module 13 are two components which are independent from each other on the substrate 11, and there is no connection between them. The touch substrate 123 can be made of the substrate material of a certain hardness, such as glass, polyimide (PI), polypropylene (PP), polystyrene (PS), acrylonitrile-butadiene-styrene (ABS), polyethylene terephthalate (PET), polyvinyl vinyl (PVC), polycarbonate (PC), polyethylene (PE), polymethyl methacrylate (PMMA) and polytetrafluoroethylene (PTFE), or other transparent materials. The touch substrate 123 also can be formed by the soft film-based materials, which include polyimide (PI), polypropylene (PP), polystyrene (PS), acrylonitrile-butadiene-styrene (ABS), polyethylene terephthalate (PET), polyvinyl chloride (PVC), polycarbonate (PC), polyethylene (PE), polymethyl methacrylate (PMMA), polytetrafluoroethylene (PTFE), cyclic olefin copolymers (COC) or a combination of above. Because the connection relationships of the components of the touch panel 101 with function of fingerprint identification in FIG. 7 is similar to those of FIG. 2, and they are not repeated herein.

In addition, in other embodiments, the electrode layer 121 can include two intersected electrode axes along two directions. The electrode axis along one direction is formed on the second surface 11S2 of the substrate 11, and the other electrode axis along another direction is formed the surface of the touch substrate 123. The second adhesive layer 17 is located between the two electrode axes along two directions. Or, the electrode layer 121 includes two intersected electrode axes along two directions. The two electrode axes along two directions are respectively formed on the two opposite surfaces of the touch substrate 123. The touch substrate 123 is adhered to the second surface 11S2 of the substrate 11 through the second adhesive layer 17.

In the embodiments, the attaching manner of the substrate 11 and the touch sensing structure 12 is full lamination. Specifically, the second adhesive layer 17 is disposed between the substrate 11 and the touch sensing structure 12, and the space there between is fully filled up with it. In other embodiments of the present disclosure, the attaching manner of the substrate 11 and the touch sensing structure 12 can be edge lamination as well. Specifically, the second adhesive layer 17 is disposed between the substrate 11 and the touch sensing structure 12, but it is only located at the periphery of the attached area of the substrate 11 and the touch sensing structure 12.

As to the touch panel 101 with function of fingerprint identification provided, the electrode layer 121 and the wiring layer 122 is firstly formed on the touch substrate 123 to obtain a complete touch sensing structure 12, and then the touch sensing structure 12 is attached to the substrate 11 thus avoiding the mutual influence caused by multiple processes of forming the electrode layer 121 and the wiring layer 122 of the touch sensing structure 12 on the substrate 11 and attaching the touch sensing structure 12 to the fingerprint identification module 13. It decreases the difficulty of the fabrication processes related to the substrate 11, such that the manufacturing yield can be improved to a certain extent.

Figure 8:
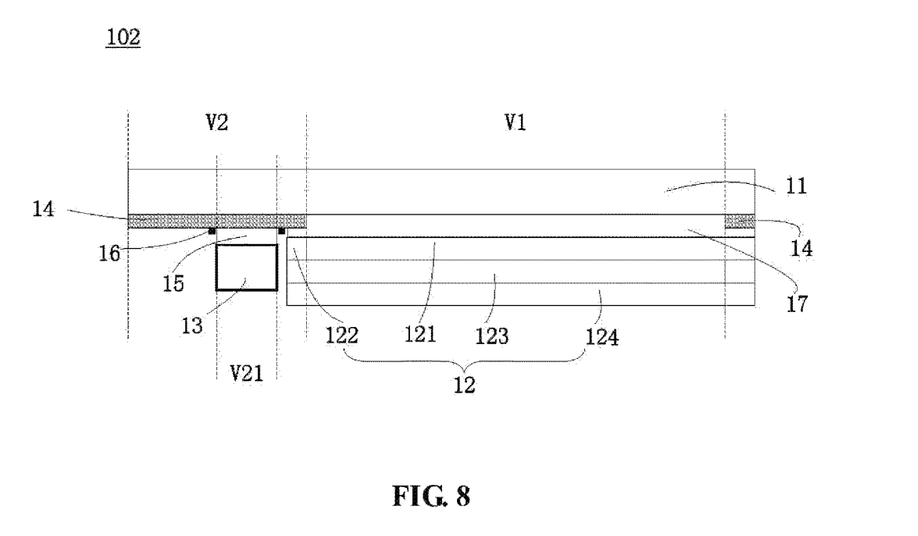
FIG. 8 is a cross-sectional drawing of the touch panel along the cross-section line AA' in FIG. 1 according to some other embodiments of the present invention.

Referring to FIG. 1 and FIG. 8, FIG. 8 is a cross-sectional drawing along the line AA' of the touch panel in FIG. 1, which shows the touch panel with function of fingerprint according to additional preferred embodiment of the present disclosure. The difference between the touch panel 102 with function of fingerprint identification from the embodiment in FIG. 7 is that the electrode layer 121 and the wiring layer 122 of the touch sensing structure 12 are formed on the upper surface of the touch substrate 123, and they are located between the second adhesive layer 17 and the touch substrate 123. In some embodiments, the touch sensing structure 12 further includes a conductive layer 124, and it is disposed on the lower surface of the touch substrate 123.

Specifically, the upper surface of the touch substrate 123 of the touch sensing structure 12 is formed with the electrode layer 121 and the wiring layer 122, and the lower surface of the touch substrate 123 is formed with the conductive layer 124. In other words, the conductive layer 124 and the electrode layer 121 are respectively disposed on the different sides of the touch substrate 123. The second adhesive layer 17 is located between the substrate 11, the electrode layer 121 and the wiring layer 122 to attach the touch sensing structure 12 to the substrate 11. It can be understood that in other embodiments of the present disclosure, a protection layer can be further included between the touch sensing structure 12 and the second adhesive layer 17. The protection layer is used for protecting the electrode layer 121 and the wiring layer 122, such that the attaching surface of the touch sensing structure 12 can be more planar and reduce the poor attaching problem caused by the unevenness of the attaching surface. The lower surface of the touch substrate 123 is formed with the conductive layer 124 to provide noise shielding function for the electrode layer 121 and the wiring layer 122 of the touch sensing structure 12. The conductive layer 124 can be an entire surface structure formed by the transparent materials, or a ring-shaped structure formed by the metal materials, which are not limited in the present disclosure. The connection relationships of the components of the touch panel 102 with function of fingerprint identification in FIG. 8 is similar to the embodiment in FIG. 2, and they are not repeated herein.

Figure 9:
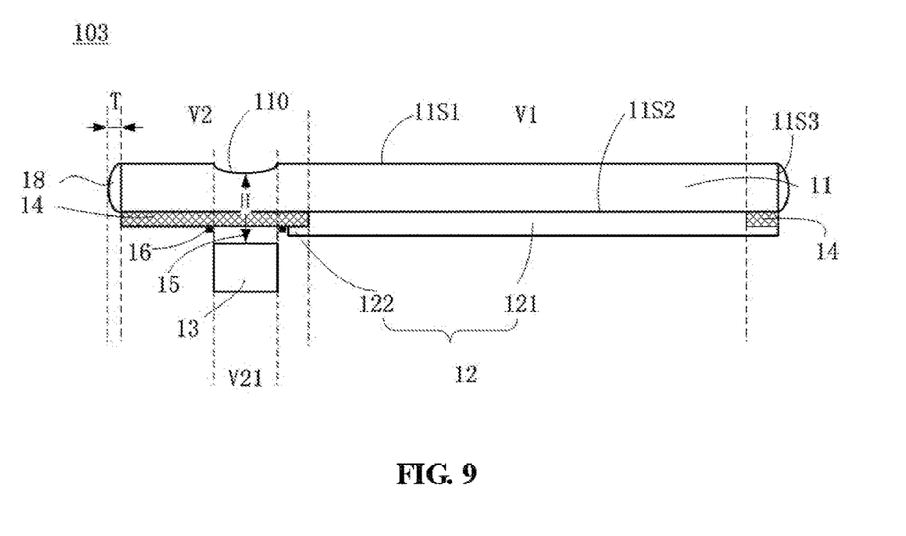
FIG. 9 is a cross-sectional drawing of the touch panel along the cross-section line AA' in FIG. 1 according to some other embodiments of the present invention.

FIG. 9 is a cross-sectional drawing of the touch panel along the cross-section line AA' in FIG. 1 according to another embodiment of the present disclosure. FIG. 9 is similar to the embodiment in FIG. 2, so that only the difference of two embodiments will be described as follows.

In some embodiments, the substrate 11 in FIG. 3B including the concave portion 110 is taken for an example. The substrate 11 can be any kind of substrate of the above embodiments. The structure and scale of the concave portion 110 can refer to the above description, which is not repeated herein.

The touch panel 103 further includes a reinforcement glue 18, and at least covers the side surface 11S3 of the substrate 11. The reinforcement glue 18 can be the glue of viscosity. The major material of the reinforcement glue 18 is acrylic resin, and liquid at room temperature. The reinforcement glue 18 can be cured by a curing process, such as UV curing (Ultraviolet curing). The viscosity of the reinforcement glue 18 is 500-1200 mPA·s. Shore scleroscope hardness of the reinforcement glue 18 is 60-90D. A maximum distance T from the side surface 11S3 of the substrate 11 to the exterior surface of the reinforcement glue 18 can be between 0.03 mm and 0.2 mm, which is preferably between 0.08 mm and 0.12 mm. The exterior surface of the reinforcement glue 18 is the surface away from the side surface 11S3. The reinforcement glue 18 can buffer the external force for protecting the substrate 11. Moreover, the reinforcement glue 18 of above characters can make the reinforcement glue 18 firmly attach to the side surface 11S3 of the substrate 11 for enhancing anti-shock and anti-crack functions, such that the whole strength of the substrate 11 and the touch panel 103 is enhanced. Or, the substrate 11 maybe has micro-cracks or notch at the side surface 11S3 in the manufacturing process. The reinforcement glue 18 can repair the micro-cracks or notch in liquid manner through the capillary action for enhancing the strength of the substrate 11. For the one-glass touch panel formed by the substrate 11 which the electrode layer 121 is directly formed on, because the electrode layer 121 is directly formed on the second surface 11S2 of the substrate 11, the strength of the substrate 11 will be influenced. The capacity of anti-drop and anti-shock of the touch panel 103 can be enhanced due to the disposal of the reinforcement glue 18 on the side surface 11S3 of the substrate 11.

In addition, for making the fingerprint identification module 13 sensitively detect the fingerprint on the substrate 11, the minimum distance H of the lowest point of the concave portion 110 and the upper surface of the fingerprint identification module 13 is between 50 μm and 450 μm. In some embodiments, the minimum distance H can be between 80 μm and 400 μm, and it can be 220 μm, 280 μm or 300 μm for example. The upper surface of the fingerprint identification module 13 is the surface of the fingerprint identification module 13 close to the lowest point of the concave portion 110. It is noted that one or more functional film can be disposed on the first surface 11S1 of the substrate 11, such as anti-reflective film or anti-glare film. When the functional film is disposed on the first surface 11S1, the minimum distance H is the distance from the touch surface for actually touching object to the upper surface of the fingerprint identification module 13, namely the minimum distance from the surface of the functional film away from the substrate 11 to the upper surface of the fingerprint identification module 13. Setting a reasonable depth D and minimum distance H of the concave portion 110 can maximize the sensibility of the fingerprint identification, and the strength of the substrate, especially the strength at the fingerprint identification area V21 is also maintained.

In addition, the touch sensing structure 12 can use the corresponding touch sensing structure in FIG. 7 or FIG. 8, which are not repeated herein.

In summary, because the fingerprint identification module 13 according to the disclosure is directly attached to the lower surface the substrate 11, it is not necessary to drill a hole on the substrate 11, such that the strength of the substrate 11 will not be affected, and the product performance can be ensured. In addition, the disposal of the fingerprint identification module 13 will not be restricted by the movable key. Thus, not only the complex package structure of the movable key is omitted, but also it is flexibly disposed in the touch panel, such that in the premise of achieving the fingerprint function, the product structure is simplified and the flexibility of the product design is improved.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A touch panel, comprising:
a substrate;
a masking layer disposed on the substrate;
a touch sensing structure disposed on the substrate;
a fingerprint identification module underlying the masking layer and adhered to the substrate via a first adhesive layer, wherein an area of the substrate occupied by the fingerprint identification module is a fingerprint identification area of the substrate;
glue applied to an exterior of the fingerprint identification module and extending from a lateral side of the fingerprint identification module to the masking layer; and
a shielding structure disposed directly on the masking layer and surrounding the fingerprint identification module by directly surrounding the first adhesive layer that adheres the fingerprint identification module to the substrate, wherein:
the masking layer, the touch sensing structure and the fingerprint identification module are disposed on a same side of the substrate, and
the fingerprint identification area of the substrate is a concave portion of the substrate.

2. The touch panel of claim 1, wherein the touch sensing structure comprises a wiring layer underlying the masking layer.

3. The touch panel of claim 1, wherein:
the touch sensing structure comprises an electrode layer and a wiring layer,
the electrode layer and the wiring layer are electrically connected to each other, and
the electrode layer is disposed on the substrate and the wiring layer is disposed under the masking layer.

4. The touch panel of claim 1, further comprising a second adhesive layer disposed between the touch sensing structure and the substrate, wherein the second adhesive layer attaches the touch sensing structure to the substrate.

5. The touch panel of claim 4, wherein:
the touch sensing structure comprises an electrode layer, a wiring layer and a touch substrate,
the electrode layer and the wiring layer are electrically connected to each other and disposed on the touch substrate, and
the electrode layer and the wiring layer are located between the second adhesive layer and the touch substrate.

6. The touch panel of claim 4, wherein:
the touch sensing structure comprises an electrode layer, a wiring layer and a touch substrate,
the electrode layer and the wiring layer are electrically connected to each other and disposed on the touch substrate, and
the electrode layer and the wiring layer are located between the second adhesive layer and the touch substrate.

7. The touch panel of claim 6, wherein:
the touch sensing structure further comprises a conductive layer disposed on the touch substrate, and
the conductive layer and the electrode layer are disposed opposite sides of the touch substrate.

8. The touch panel of claim 1, wherein:
the substrate has a first surface and a second surface opposite to the first surface,
the touch sensing structure and the fingerprint identification module are disposed on the second surface, and
the concave portion extends from the first surface toward the second surface.

9. The touch panel of claim 8, wherein a distance between the first surface of the substrate and a lowest point of the concave portion is less than or equal to 1.7 mm.

10. The touch panel of claim 8, wherein a distance between the first surface of the substrate and a lowest point of the concave portion is larger than or equal to 0.05 mm and less than or equal to 0.55 mm.

11. The touch panel of claim 8, wherein a distance between the first surface of the substrate and a lowest point of the concave portion is larger than or equal to 0.02 mm and less than or equal to 0.45 mm.

12. The touch panel of claim 1, wherein a minimum distance between a lowest point of the concave portion and the fingerprint identification module is larger than or equal to 15 μm and less than or equal to 550 μm.

13. The touch panel of claim 1, wherein a minimum distance between a lowest point of the concave portion and the fingerprint identification module is larger than or equal to 80 μm and less than or equal to 400 μm.

14. The touch panel of claim 1, wherein:
the concave portion has a bottom surface and at least one side surface adjacent to the bottom surface, and
an angle between the bottom surface and the side surface is larger than 90 degree and less than 180 degree.

15. The touch panel of claim 1, wherein:
the concave portion has two adjacent side surfaces, and
an angle between the two adjacent side surfaces is larger than 90 degree and less than 180 degree.

16. The touch panel of claim 1, wherein the first adhesive layer further covers a part of a side surface of the fingerprint identification module or all surfaces of the fingerprint identification module.

17. The touch panel of claim 1, wherein a thickness of the first adhesive layer is larger than 3 μm and less than or equal to 30 μm.

18. The touch panel of claim 1, wherein:
the substrate has a first surface, a second surface opposite to the first surface, and a side surface adjacent to the first surface and the second surface,
the touch sensing structure and the fingerprint identification module are disposed on one side of the second surface, and
the glue at least covers the side surface.

19. The touch panel of claim 8, wherein:
the substrate further comprises a side surface,
the side surface is adjacent to the first surface and the second surface, and
the-glue at least covers the side surface.

20. The touch panel of claim 18, wherein:
a viscosity of the glue is 500-1200 mPa·s, and
a Shore scleroscope hardness of the glue is 60-90D.

21. The touch panel of claim 18, wherein a distance between the side surface of the substrate and an exterior surface of the glue is larger than or equal to 30 μm and less than or equal to 200 μm.

22. The touch panel of claim 2, wherein the fingerprint identification module is a fingerprint sensing electrode structure.

* * * * *